United States Patent
Yang et al.

(10) Patent No.: US 11,350,321 B2
(45) Date of Patent: May 31, 2022

(54) MEASUREMENT CONFIGURATION METHOD AND RELATED PRODUCT

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/625,563

(22) PCT Filed: Jul. 20, 2017

(86) PCT No.: PCT/CN2017/093672
§ 371 (c)(1),
(2) Date: Dec. 20, 2019

(87) PCT Pub. No.: WO2019/014892
PCT Pub. Date: Jan. 24, 2019

(65) Prior Publication Data
US 2021/0051536 A1   Feb. 18, 2021

(51) Int. Cl.
*H04W 36/00* (2009.01)
*H04W 76/30* (2018.01)
(Continued)

(52) U.S. Cl.
CPC ....... *H04W 36/0058* (2018.08); *H04L 5/0048* (2013.01); *H04L 41/0803* (2013.01);
(Continued)

(58) Field of Classification Search
CPC . H04W 24/10; H04W 24/08; H04W 36/0085; H04W 76/27; H04W 36/30
See application file for complete search history.

(56) References Cited

U.S. PATENT DOCUMENTS 8,593,990 B1   11/2013   Henttonen et al.
8,787,834 B2 *   7/2014   Lee .................. H04W 76/27
                                                    455/67.11
(Continued)

FOREIGN PATENT DOCUMENTS

CN   102209343 A   10/2011
CN   102281568 A   12/2011
(Continued)

OTHER PUBLICATIONS

International Search Report in the international application No. PCT/CN2017/093672, dated Mar. 27, 2018 (2 pages).
(Continued)

*Primary Examiner* — Dung Hong
(74) *Attorney, Agent, or Firm* — Perkins Coie LLP (57) ABSTRACT

Provided are a method for measurement configuration and a related product, which include that: configuration information is acquired, the measurement configuration information including a measurement configuration of a terminal in a disconnected state and the disconnected state at least including one of an idle state and an inactive state; and a measurement result is acquired according to the measurement configuration. According to the embodiments of the application, a signaling overhead in network configuration after the terminal is switched to a connected state is reduced, and improvement in efficiency of network configuration of the terminal is facilitated.

19 Claims, 6 Drawing Sheets

(51) Int. Cl.
  *H04W 76/27* (2018.01)
  *H04L 5/00* (2006.01)
  *H04L 41/0803* (2022.01)
  *H04W 24/08* (2009.01)
  *H04W 84/04* (2009.01)

(52) U.S. Cl.
  CPC ........ *H04W 24/08* (2013.01); *H04W 36/0011* (2013.01); *H04W 36/0061* (2013.01); *H04W 76/27* (2018.02); *H04W 76/30* (2018.02); *H04W 84/042* (2013.01)

(56) References Cited

U.S. PATENT DOCUMENTS

| | | | |
|---|---|---|---|
| 9,125,114 B2* | 9/2015 | Yang | H04W 36/0088 |
| 10,750,390 B2* | 8/2020 | Kim | H04W 16/18 |
| 2006/0019695 A1 | 1/2006 | Miyazaki | |
| 2009/0239533 A1* | 9/2009 | Somasundaram | H04J 11/0093 455/434 |
| 2010/0222059 A1* | 9/2010 | Pani | H04W 72/0453 455/436 |
| 2012/0094608 A1* | 4/2012 | Shi | H04W 24/10 455/67.11 |
| 2012/0157153 A1* | 6/2012 | Song | H04W 52/0245 455/522 |
| 2012/0311147 A1* | 12/2012 | Keskitalo | H04W 24/10 709/224 |
| 2012/0329402 A1 | 12/2012 | Ren | |
| 2013/0012188 A1 | 1/2013 | Gao | |
| 2013/0178224 A1* | 7/2013 | Chang | H04B 17/309 455/452.1 |
| 2014/0038609 A1 | 2/2014 | Henttonen et al. | |
| 2014/0056243 A1* | 2/2014 | Pelletier | H04W 76/15 370/329 |
| 2014/0098690 A1* | 4/2014 | Siomina | H04B 17/309 370/252 |
| 2014/0295847 A1 | 10/2014 | Futaki | |
| 2014/0370914 A1* | 12/2014 | Jung | H04W 4/02 455/456.1 |
| 2015/0016282 A1* | 1/2015 | Su | H04W 36/0088 370/252 |
| 2015/0018010 A1 | 1/2015 | Fischer | |
| 2015/0045035 A1* | 2/2015 | Nigam | H04W 36/0079 455/436 |
| 2015/0223193 A1* | 8/2015 | Chang | H04M 1/72457 455/456.2 |
| 2015/0373597 A1* | 12/2015 | Kim | H04W 36/0016 455/436 |
| 2015/0382264 A1 | 12/2015 | Cho et al. | |
| 2016/0337798 A1 | 11/2016 | Fischer | |
| 2017/0006510 A1* | 1/2017 | Kaikkonen | H04W 36/0094 |
| 2017/0064571 A1* | 3/2017 | Kusashima | H04W 48/16 |
| 2017/0094676 A1* | 3/2017 | Kim | H04L 1/1887 |
| 2017/0134904 A1 | 5/2017 | Fischer | |
| 2017/0215096 A1* | 7/2017 | Moon | H04L 5/001 |
| 2018/0035339 A1* | 2/2018 | Mitsui | H04W 72/04 |
| 2018/0198867 A1* | 7/2018 | Dao | H04L 67/143 |
| 2018/0227815 A1* | 8/2018 | Sharma | H04W 28/08 |
| 2018/0227819 A1* | 8/2018 | Lee | H04W 36/0061 |
| 2018/0255472 A1* | 9/2018 | Chendamarai Kannan | H04W 72/0453 |
| 2018/0332659 A1* | 11/2018 | Hwang | H04W 74/0833 |
| 2018/0343635 A1* | 11/2018 | Edge | G01S 5/00 |
| 2019/0116530 A1* | 4/2019 | Da Silva | H04B 7/0626 |
| 2019/0182737 A1* | 6/2019 | Futaki | H04W 36/14 |
| 2019/0320355 A1* | 10/2019 | Da Silva | H04W 72/046 |
| 2020/0068484 A1* | 2/2020 | da Silva | H04B 7/0617 |

FOREIGN PATENT DOCUMENTS

| | | |
|---|---|---|
| CN | 102355692 A | 2/2012 |
| CN | 105052188 A | 11/2015 |
| CN | 105075387 A | 11/2015 |
| CN | 105340316 A | 2/2016 |
| EP | 2534872 A1 | 12/2012 |
| EP | 2621115 A1 | 7/2013 |
| EP | 2763450 A1 | 8/2014 |
| EP | 2621115 A4 | 4/2017 |
| GB | 2496018 A | 5/2013 |
| JP | 2020511850 A | 4/2020 |
| KR | 20130086223 A | 7/2013 |
| KR | 20140123501 A | 10/2014 |
| RU | 2556238 C2 | 7/2015 |
| RU | 2603626 C2 | 11/2016 |
| WO | 2012039440 A1 | 3/2012 |
| WO | 2013047833 A1 | 4/2013 |
| WO | 2018175891 A1 | 9/2018 |

OTHER PUBLICATIONS

Supplementary European Search Report in the European application No. 17917967.6, dated Mar. 11, 2020.
English translation of the Written Opinion of the International Search Authority in the international application No. PCT/CN2017/093672, dated Mar. 27, 2018.
First Office Action of the Russian application No. 2019139463, dated Aug. 18, 2020.
First Office Action of the Canadian application No. 3063224, dated Jan. 7, 2021.
Ericsson, Faster measurements and signaling for mobility [online], 3GPP TSG RAN WG2#97bis R2-1702713, Mar. 25, 2017. 5 pages.
MediaTek Inc. (Email discussion rapporteur), Report of email discussion [98#33] [NR/Measurement configuration] [online], 3GPP TSG RAN WG2 adhoc_2017_06_NR R2-1706570, Jun. 16, 2017. 20 pages.
Nokia, Alcatel-Lucent Shanghai Bell, Solutions for wider bandwidth options [online], 3GPP TSG RAN WG1#88 R1-1703193, Feb. 16, 2017. 12 pages.
First Office Action of the Japanese application No. 2019-561847, dated Aug. 17, 2021. 10 pages with English translation.
Second Office Action of the Canadian application No. 3063224, dated Oct. 8, 2021. 4 pages.
First Office Action of the European application No. 17917967.6, dated Oct. 26, 2021. 8 pages.
Decision of Refusal of the Korean application No. 10-2019-7032779, dated Oct. 14, 2021. 8 pages with English translation.
OPPO, Discussion on measurement configuration enhancement in INACTIVE state, Discussion and Decision, 3GPP TSG-RAN2#Ad Hoc R2-1707083, Jun. 27-29, 2017.
Notice of Allowance of the Russian application No. 2019139463, dated Nov. 25, 2020.
Office Action of the Indian application No. 201917054208, dated Apr. 24, 2021.
Nokia, Alcatel-Lucent Shanghai Bell, "Mobility Measurement in IDLE and INACTIVE Mode", 3GPP TSG-RAN WG2 Meeting #96 R2-167712, Reno, USA, Nov. 14-18, 2016.
First Office Action of the Korean application No. 10-2019-7032779, dated Apr. 25, 2021.
Written Opinion of the Singaporean application No. 11201911943P, dated Jun. 4, 2021.
Decision of Rejection of the Japanese application No. 2019-561847, dated Dec. 10, 2021. 6 pages with English translation.
Notice of Final Rejection of the Korean application No. 10-2019-7032779, dated Nov. 23, 2021. 6 pages with English translation.

* cited by examiner

MEASUREMENT CONFIGURATION METHOD AND RELATED PRODUCT

CROSS-REFERENCE

This application is the US national stage of PCT Application No. PCT/CN2017/093672, filed on Jul. 20, 2017 and named after "MEASUREMENT CONFIGURATION METHOD AND RELATED PRODUCT", the contents of which are hereby incorporated by reference in its entirety.

TECHNICAL FIELD

The application relates to the technical field of communications, and more particularly to a method for measurement configuration and a related product.

BACKGROUND

In a 4th Generation mobile communication (4G) Long Term Evolution (LTE) system, when a terminal is in a connected state, the terminal makes measurement based on an idle-state Reference Signal (RS) and a connected-state used RS, and measurement accuracy is relatively high. A network accordingly executes such operations on the terminal as switching, secondary Service Node (SN) addition, secondary SN deletion, secondary SN modification and the like. When the terminal is in a disconnected state (for example, idle or inactive), measurement of a network signal by the terminal is not so accurate, which may serve as a basis for cell selection and reselection but not a basis for the operations including switching, secondary SN addition/deletion/modification and the like.

SUMMARY

Embodiments of the application provide a method for measurement configuration and a related product, to determine the bit number of uplink control signaling that is fed back and reduce an uplink control signaling overhead.

According to a first aspect, the embodiments of the application provide a method for measurement configuration, which may include the following operations.

A terminal acquires measurement configuration information, the measurement configuration information including a measurement configuration of the terminal in a disconnected state and the disconnected state at least including one of an idle state and an inactive state.

The terminal acquires a measurement result according to the measurement configuration.

According to a second aspect, the embodiments of the application provide a method for measurement configuration, which may include the following operation.

A network device transmits measurement configuration information, the measurement configuration information including a measurement configuration of a terminal in a disconnected state, the measurement configuration information being used for the terminal to make measurement according to the measurement configuration to acquire a measurement result and the disconnected state at least including one of an idle state and an inactive state.

According to a third aspect, the embodiments of the application provide a terminal, which has a function of implementing operations of the terminal in the method design. The function may be realized through hardware and may also be realized by executing corresponding software through the hardware. The hardware or the software includes one or more modules corresponding to the function. In a possible design, the terminal includes a processor, and the processor is configured to support the terminal to realize the corresponding function in the method. Furthermore, the terminal may further include a transceiver, and the transceiver is configured to support communication between the terminal and a network device. Furthermore, the terminal may further include a memory, and the memory is configured to be coupled to the processor, and stores a necessary program instruction and data of the terminal.

According to a fourth aspect, the embodiments of the application provide a network device, which has a function of implementing operations of the network device in the method design. The function may be realized through hardware and may also be realized by executing corresponding software through the hardware. The hardware or the software includes one or more modules corresponding to the function. In a possible design, the network device includes a processor, and the processor is configured to support the network device to realize the corresponding function in the method. Furthermore, the network device may further include a transceiver, and the transceiver is configured to support communication between the network device and a terminal. Furthermore, the network device may further include a memory, and the memory is configured to be coupled to the processor, and stores a necessary program instruction and data of the network device.

According to a fifth aspect, the embodiments of the application provide a terminal, which may include a processor, a memory, a communication interface and one or more programs. The one or more programs may be stored in the memory and configured to be executed by the processor, and the programs may include instructions configured to execute the steps in any method according to the first aspect of the embodiments of the application.

According to a sixth aspect, the embodiments of the application provide a network device, which may include a processor, a memory, a transceiver and one or more programs. The one or more programs may be stored in the memory and configured to be executed by the processor, and the programs may include instructions configured to execute the steps in any method according to the second aspect of the embodiments of the application.

According to a seventh aspect, the embodiments of the application provide a computer-readable storage medium, which may store a computer program for electronic data exchange, the computer program enabling a computer to execute part or all of the steps described in any method according to the first aspect of the embodiments of the application.

According to an eighth aspect, the embodiments of the application provide a computer-readable storage medium, which may store a computer program for electronic data exchange, the computer program enabling a computer to execute part or all of the steps described in any method according to the second aspect of the embodiments of the application.

According to a ninth aspect, the embodiments of the application provide a computer program product, which may include a non-transitory computer-readable storage medium storing a computer program. The computer program may be operable to enable a computer to execute part or all of the steps described in any method according to the first aspect of the embodiments of the application. The computer program product may be a software installation package.

According to a tenth aspect, the embodiments of the application provide a computer program product, which may include a non-transitory computer-readable storage medium storing a computer program. The computer program may be operable to enable a computer to execute part or all of the steps described in any method according to the second aspect of the embodiments of the application. The computer program product may be a software installation package.

It can be seen that, according to the embodiments of the application, the terminal acquires the measurement configuration information at first, the measurement configuration information including the measurement configuration of the terminal in the disconnected state and the disconnected state at least including one of the idle state and the inactive state, and then the terminal acquires the measurement result according to the measurement configuration. The terminal in the disconnected state may measure a network signal according to the measurement configuration information to acquire the measurement result, the terminal, after being switched to a connected state, may report the measurement result to the network device and the network device may fast pre-configure the terminal according to the measurement result, so that a signaling overhead in network configuration after the terminal is switched to the connected state is reduced, and improvement in efficiency of network configuration of the terminal is facilitated.

BRIEF DESCRIPTION OF DRAWINGS

The drawings to be used for descriptions about the embodiments or a conventional art will be simply introduced below.

DETAILED DESCRIPTION

5th-Generation (5G) New Radio (NR) is a subject raised recently by the 3rd Generation Partnership Project (3GPP). Along with increasingly deep discussions about 5G technology, on one hand, a new technology researched and developed later tends to be compatible with a technology that has been standardized before because of backward compatibility of a communication system; and on the other hand, flexibility of 5G may be inevitably sacrificed for compatibility because of existence of numerous existing designs for 4G LTE systems and thus bring reduction in performance. Therefore, researches in two directions are concurrently made by the 3GPP at present. Herein, the technical discussion group not taking backward compatibility into consideration is called 5G NR.

At present, in a research on 5G NR systems, the 3GPP further introduces a new state, i.e., an inactive state, besides an idle state and a connected state supported by an existing LTE system. A main function of the inactive state is to reduce consumption of measurement power and overhead of handover signaling of a terminal as much as possible when the terminal transmits no data and simultaneously recover a link as fast as possible when the terminal transmits data. When the terminal is in the inactive state, a processing manner for mobility is like that in the idle state, namely a cell reselection criterion is adopted for movement. When the terminal is in the connected state, the terminal makes measurement based on an idle-state used RS and a connected-state used RS to acquire a measurement result, and a network device executes operations including switching, secondary SN addition, secondary SN deletion, secondary SN modification and the like on the terminal based on the measurement result. When the terminal is switched from a disconnected state to the connected state, addition for the terminal by the network device is usually implemented in the following two operating manners: 1: the network device (for example, a primary SN of the terminal) does not get any measurement information and speculate an SN suitable for the terminal according to a geographical position; and 2: the network device configures measurement for the terminal and waits for a measurement result for addition, and in such a case, an addition flow is high in signaling overhead.

The technical solutions in the embodiments of the application will be described below in combination with the drawings.

Figure 1:
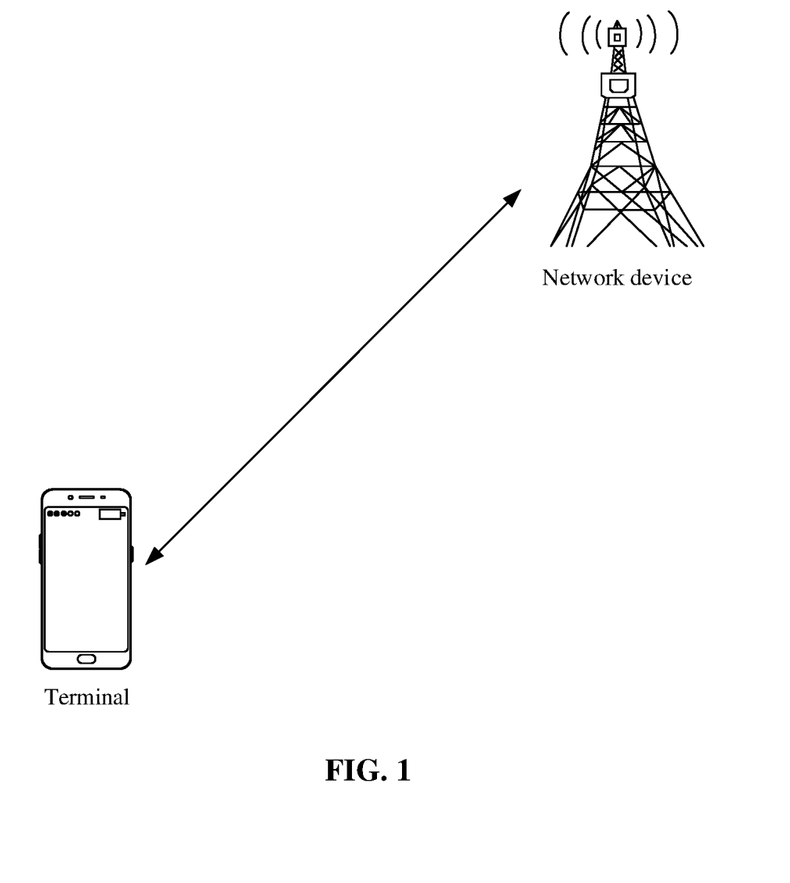
FIG. 1 is a possible network architecture diagram of a communication system according to an embodiment of the application.

Referring to FIG. 1, FIG. 1 is a possible network architecture of an exemplary communication system according to an embodiment of the application. The exemplary communication system may be, for example, a 5G NR system or other similar communication systems. The exemplary communication system specifically includes a network device and a terminal. When the terminal accesses a mobile communication network provided by the network device, the terminal forms a communication connection connectable with the network device through a wireless link. Such a communication connection may be a single connection or a dual-connection or a multi-connection. When the communication connection is a single connection, the network device may be an LTE base station or an NR base station (also called a gNB). When the communication is a dual-connection (which may specifically be implemented by a Carrier Aggregation (CA) technology or implemented by multiple network devices) and when the terminal is connected with the multiple network devices, the multiple network devices may include a Master Cell Group (MCG) and Secondary Cell Groups (SCGs), data is transmitted back between the cell groups through backhauls, the MCG may be an LTE base station and the SCGs may be LTE base stations, or, the MCG may be an NR base station and the SCGs may be LTE base stations, or, the MCG may be an NR base station and the SCGs may be NR base stations.

In the embodiments of the application, terms "network" and "system" are often used alternately, and their meanings may be understood by those skilled in the art. A terminal involved in the embodiments of the application may include various handheld devices, vehicle-mounted devices, wearable devices, computing devices or other processing devices connectable to wireless modems, which have a wireless communication function, as well as User Equipment (UE), Mobile Stations (MSs), terminal devices and the like in various forms. For convenient description, the devices mentioned above are collectively referred to as terminals.

Figure 2:
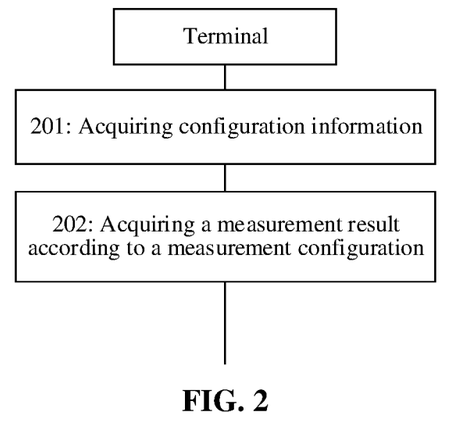
FIG. 2 is a flowchart of a method for measurement configuration according to an embodiment of the application.

Referring to FIG. 2, FIG. 2 illustrates a method for measurement configuration according to an embodiment of the application. The method is applied to the exemplary communication system and includes the following operations.

In the part 201, a terminal acquires measurement configuration information, the measurement configuration information including a measurement configuration of the terminal in a disconnected state and the disconnected state at least including one of an idle state and an inactive state.

The measurement configuration information may be preset measurement configuration information or configured and transmitted by a network device. There are no uniqueness limits made herein.

In the part 202, the terminal acquires a measurement result according to the measurement configuration.

The measurement result is obtained by measurement of the terminal in the disconnected state.

In the possible example, the measurement result is configured for the network device to pre-configure the terminal in the connected state, the pre-configuring including configuring a secondary carrier and/or a secondary SN.

In the possible example, the measurement result includes measurement results about one or more carriers, and the measurement results about the one or more carriers are used for the network device to add one or more carriers meeting a preset condition as secondary carriers of the terminal; or, the measurement result includes measurement results about one or more other SNs, and the measurement results about the one or more other SNs are used for the network device to add one or more other SNs meeting a preset condition as secondary SNs of the terminal.

The other SNs are SNs except a primary SN of the terminal, and for a base station, the preset condition may be that the measurement result is greater than a preset threshold. There are no limits made thereto.

It can be seen that, in the embodiment of the application, the terminal acquires the measurement configuration information, the measurement configuration information including the measurement configuration of the terminal in the disconnected state and the disconnected state at least including one of the idle state and the inactive state, and then the terminal acquires the measurement result according to the measurement configuration. The terminal in the disconnected state may measure a network signal according to the measurement configuration information to acquire the measurement result, the terminal, after being switched to a connected state, may report the measurement result to the network device and the network device may fast pre-configure the terminal according to the measurement result, so that a signaling overhead in network configuration after the terminal is switched to the connected state is reduced, and improvement in the efficiency of network configuration of the terminal is facilitated.

In a possible example, after the operation that the terminal acquires the measurement result according to the measurement configuration, the method may further include that: the terminal is switched to a connected state; and the terminal reports the measurement result.

In the possible example, the measurement configuration information includes a triggering event of measurement reporting, and the operation that the terminal reports the measurement result includes that: the terminal determines whether to report the measurement result or not according to the triggering event of measurement reporting and, reports the measurement result if the triggering event is initiated.

The triggering event of measurement reporting may be, for example, that signal strength or signal quality of a neighbor serving cell is measured to be greater than a preset threshold or that the signal strength or signal quality of the neighbor serving cell is measured to be higher than signal strength or signal quality of a presently connected serving cell by an offset, etc. There are no uniqueness limits made herein. The above-described signal strength or signal quality may refer to any value representing the signal strength and quality such as the signal strength, the signal quality and a signal-to-noise ratio. There are no uniqueness limits made herein.

In the possible example, the operation that the terminal reports the measurement result includes that: the terminal transmits indication information to the network device, the indication information being used to indicate the measurement result.

In a possible example, the operation that the terminal reports the measurement result may include that: the terminal receives from the network device a request for reporting the measurement result; and the terminal reports the measurement result to the network device.

In a possible example, uplink signaling bearing the reported measurement result may include any one of: a request for connection establishment, a request for connection resumption, signaling about connection establishment completion and signaling about connection resumption completion.

In a possible example, the measurement configuration information may include configuration information of an RS, and the operation that the terminal acquires the measurement result according to the measurement configuration may include that: after the terminal is switched to the inactive state, the RS is measured according to the measurement configuration to obtain a measurement result.

It can be seen that, in the example, the terminal may start measuring to acquire the measurement result after being switched, so that influence caused by delayed processing to real-time performance is avoided, and the real-time performance of configuring network information of the terminal is improved.

In a possible example, the measurement configuration information may include the measurement configuration information of the RS, and the operation that the terminal acquires the measurement result according to the measurement configuration may include that: after the terminal is switched to the inactive state, responsive to detecting uplink data or a downlink paging message, the RS is measured according to the measurement configuration to obtain the measurement result.

It can be seen that, in the example, the terminal, after being switched to the inactive state, makes measurement according to a requirement to acquire the measurement result, so that additional power consumption caused by unnecessary measurement is avoided, and improvement in management efficiency of power consumption of the terminal is facilitated.

In the possible example, the RS includes an idle-state used RS and/or a connected-state used RS.

The idle-state used RS may be, for example, a Cell Reference Signal (CRS) in an LTE system or a Sync Signal (SS) or SS block (the SS block at least includes an SS) in a 5G NR system. The connected-state used RS may be, for example, a De Modulation Reference Signal (DMRS) and Channel State Information Reference Signal (CSI-RS) in the LTE system or a CSI-RS in the 5G system. There are no uniqueness limits made herein.

In a possible example, the method may further include that: responsive to detecting that a present area is not a valid measurement area and/or detecting that present time is not valid measurement time, the terminal releases the measurement configuration information.

It can be seen that, in the example, the terminal, responsive to detecting that a measurement condition is not met, timely releases an occupied resource associated with the measurement configuration information, so that improvement in management efficiency of radio transmission resources of the terminal is facilitated.

In a possible example, signaling bearing the measurement configuration information may be Radio Resource Control (RRC) connection release signaling or RRC reconfiguration signaling.

The measurement configuration information includes at least one of: a measurement frequency, a measurement pattern, valid measurement time and a valid measurement area.

The measurement frequency includes a measurement spectrum frequency. The valid measurement time is configured to identify time when the measurement configuration is valid after the inactive state is entered. The valid measurement area includes one or more cells or includes one or more Radio Access Network (RAN) areas.

It can be seen that, in the example, the terminal may be accurately instructed by the measurement configuration information to make measurement to acquire the measurement result, so that improvement in accuracy of network configuration of the terminal is facilitated, in addition, an additional signaling overhead is also reduced, and configuration efficiency is improved.

Figure 3:
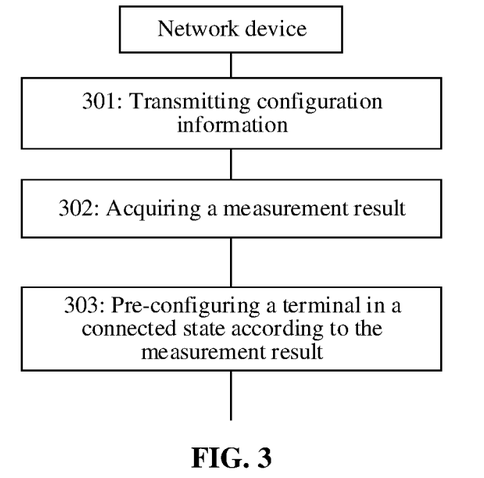
FIG. 3 is a flowchart of another method for measurement configuration according to an embodiment of the application.

Referring to FIG. 3, FIG. 3 illustrates a method for measurement configuration according to an embodiment of the application. The method is applied to the exemplary communication system and includes the following operations.

In the part 301, a network device transmits measurement configuration information, the measurement configuration information including a measurement configuration of a terminal in a disconnected state, the measurement configuration information being used for the terminal to make measurement according to the measurement configuration to acquire a measurement result and the disconnected state at least including one of an idle state and an inactive state.

In the part 302, the network device acquires the measurement result, the measurement result being reported by the terminal that is switched to a connected state.

The measurement result is obtained by measurement of the terminal in the disconnected state.

In the part 303, the network device makes preset configuration for the terminal in the connected state according to the measurement result, the pre-configuring including configuring a secondary carrier and/or a secondary SN.

In a possible example, the measurement result may include measurement results about one or more carriers, and the operation that the network device makes preset configuration for the terminal in the connected state according to the measurement result may include that: the network device adds one or more carriers meeting a preset condition as secondary carriers of the terminal, the preset condition being that the measurement result is greater than a preset threshold.

In a possible example, the measurement result may include measurement results about one or more other SNs, and the operation that the network device makes preset configuration for the terminal in the connected state according to the measurement result may include that: the network device adds one or more other SNs meeting a preset condition as secondary carriers of the terminal, the other SN being an SN except a primary SN of the terminal and the preset condition being that the measurement result is greater than a preset threshold.

It can be seen that, in the embodiment of the application, the terminal acquires the measurement configuration information, the measurement configuration information including the measurement configuration of the terminal in the disconnected state and the disconnected state at least including one of the idle state and the inactive state, and then the terminal acquires the measurement result according to the measurement configuration. The terminal in the disconnected state may measure a network signal according to the measurement configuration information to acquire the measurement result, the terminal, after being switched to a connected state, may report the measurement result to the network device and the network device may fast pre-configure the terminal according to the measurement result, so that a signaling overhead in network configuration after the terminal is switched to the connected state is reduced, and improvement in efficiency of network configuration of the terminal is facilitated.

In a possible example, the measurement configuration information may include configuration information of an RS for measurement.

In a possible example, the RS may include an idle-state used RS and/or a connected-state used RS.

In a possible example, the measurement configuration information may include a triggering event of measurement reporting, and the terminal may determine whether to report the measurement result or not according to the triggering event of measurement reporting and, report the measurement result if the triggering event is initiated.

In a possible example, the operation that the network device acquires the measurement result may include that: the network device receives indication information from the terminal, the indication information being used to indicate the measurement result.

In a possible example, the operation that the network device acquires the measurement result may include that: the network device transmits a request for reporting the measurement result to the terminal; and the network device receives the measurement result reported by the terminal in response to the request for reporting the measurement result.

In a possible example, uplink signaling bearing the measurement result may include any one of: a request for connection establishment, a request for connection resumption, signaling about connection establishment completion and signaling about connection resumption completion.

In a possible example, signaling bearing the measurement configuration information may be RRC connection release signaling or RRC reconfiguration signaling.

The measurement configuration information may include at least one of: a measurement frequency, a measurement pattern, valid measurement time and a valid measurement area.

Figure 4:
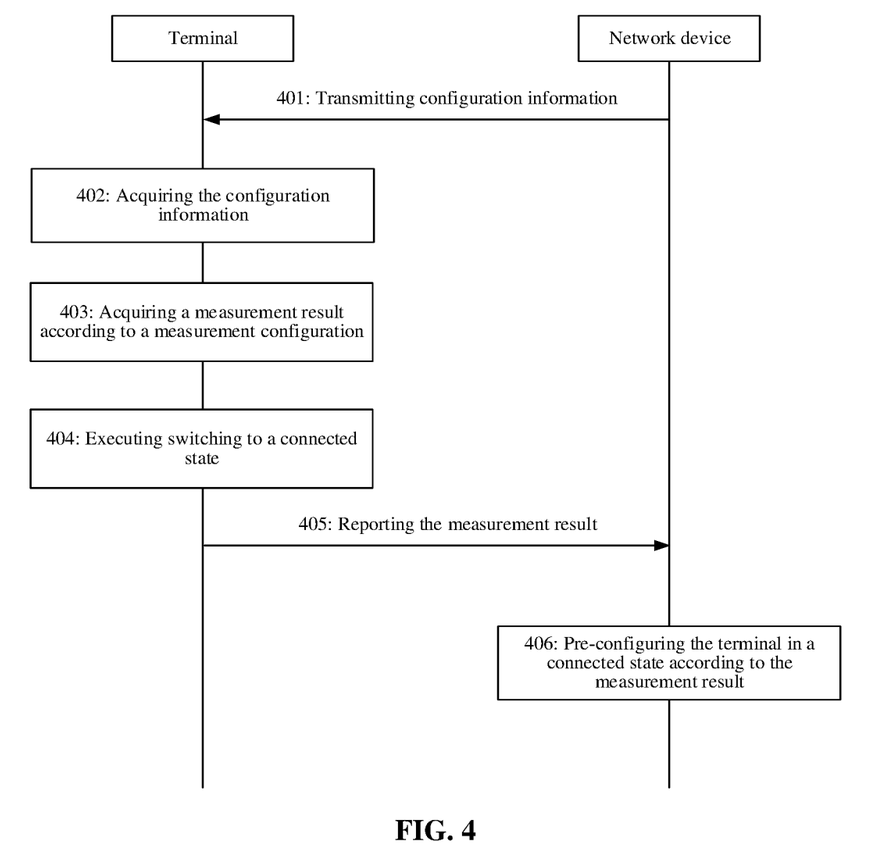
FIG. 4 is a flowchart of another method for measurement configuration according to an embodiment of the application.

Matched with the embodiments shown in FIG. 2 and FIG. 3, referring to FIG. 4, FIG. 4 illustrates a method for measurement configuration according to an embodiment of the application. The method is applied to the exemplary communication system and includes the following operations.

In the part 401, a network device transmits configuration information, the measurement configuration information including a measurement configuration of a terminal in a disconnected state, the measurement configuration information being used for the terminal to make measurement according to the measurement configuration to acquire a measurement result and the disconnected state at least including one of an idle state and an inactive state.

In the part 402, the terminal acquires the measurement configuration information, the measurement configuration information including the measurement configuration of the terminal in the disconnected state and the disconnected state at least including one of the idle state and the inactive state.

In the part 403, the terminal acquires the measurement result according to the measurement configuration.

The measurement result may be obtained by measurement of the terminal in the disconnected state.

In the part 404, the terminal is switched to a connected state.

In the part 405, the terminal reports the measurement result.

In the part 406, the network device acquires the measurement result, the measurement result being reported by the terminal that is switched to the connected state.

In the part 407, the network device makes preset configuration for the terminal in the disconnected state according to the measurement result, the pre-configuring including configuring a secondary carrier and/or a secondary SN.

In a possible example, the reported measurement result may include measurement results about one or more carriers, and the measurement results about the one or more carriers may be configured for the network device to add one or more carriers meeting a preset condition as secondary carriers of the terminal; or, the reported measurement result may include measurement results about one or more other SNs, and the measurement results of the one or more other SNs may be configured for the network device to add one or more other SNs meeting a preset condition as secondary SNs of the terminal.

The other SNs may be SNs except a primary SN of the terminal, and for a base station, the preset condition may be that the measurement result is greater than a preset threshold. There are no limits made thereto.

It can be seen that, in the embodiment of the application, the terminal acquires the measurement configuration information, the measurement configuration information including the measurement configuration of the terminal in the disconnected state and the disconnected state at least including one of the idle state and the inactive state, and then the terminal acquires the measurement result according to the measurement configuration. The terminal in the disconnected state may measure a network signal according to the measurement configuration information to acquire the measurement result, the terminal, after being switched to a connected state, may report the measurement result to the network device and the network device may fast pre-configure the terminal according to the measurement result, so that a signaling overhead in network configuration after the terminal is switched to the connected state is reduced, and improvement in efficiency of network configuration of the terminal is facilitated.

In the possible example, the measurement configuration information includes a triggering event of measurement reporting, and the operation that the terminal reports the measurement result includes that: the terminal determines whether to report the measurement result or not according to the triggering event of measurement reporting and, reports the measurement result if terminal determines to report the measurement result.

The triggering event of measurement reporting may be, for example, that signal strength or signal quality of a neighbor serving cell is measured to be greater than a preset threshold or that the signal strength or signal quality of the neighbor serving cell is measured to be higher than signal strength or signal quality of a presently connected serving cell by an offset, etc. There are no uniqueness limits made herein. The above-described signal strength or signal quality may refer to any value representing the signal strength and quality such as the signal strength, the signal quality and a signal-to-noise ratio. There are no uniqueness limits made herein.

In a possible example, the terminal may determine whether to report the measurement result or not according to the triggering event of measurement reporting and, reports the measurement result if terminal determines to report the measurement result.

In the possible example, the operation that the terminal reports the measurement result includes that: the terminal transmits indication information to the network device, the indication information being used to indicate the measurement result.

In a possible example, the operation that the terminal reports the measurement result may include that: the terminal receives from the network device a request for reporting the measurement result; and the terminal reports the measurement result to the network device.

In a possible example, the operation that the network device acquires the measurement result may include that: the network device receives the indication information from the terminal, the indication information being used to indicate the measurement result.

In a possible example, the operation that the network device acquires the measurement result may include that: the network device transmits the request for reporting the measurement result to the terminal; and the network device receives the measurement result reported by the terminal in response to the request for reporting the measurement result.

In a possible example, uplink signaling bearing the reported measurement result may include any one of: a request for connection establishment, a request for connection resumption, signaling about connection establishment completion and signaling about connection resumption completion.

In a possible example, the measurement configuration information may include configuration information of an RS, and the operation that the terminal acquires the measurement result according to the measurement configuration may include that: after the terminal is switched to the inactive state, the RS is measured according to the measurement configuration to obtain a measurement result.

It can be seen that, in the example, the terminal may start measuring to acquire the measurement result after handover, so that influence caused by delayed processing to real-time performance is avoided, and the real-time performance of configuring network information of the terminal can be improved.

In a possible example, the measurement configuration information may include the measurement configuration information of the RS, and the operation that the terminal acquires the measurement result according to the measurement configuration may include that: after the terminal is switched to the inactive state, responsive to detecting uplink data or a downlink paging message, the RS is measured according to the measurement configuration to obtain the measurement result.

It can be seen that, in the example, the terminal, after being switched to the inactive state, makes measurement according to a requirement to acquire the measurement result, so that additional power consumption caused by unnecessary measurement is avoided, and improvement in management efficiency of power consumption of the terminal is facilitated.

In the possible example, the RS includes an idle-state used RS and/or a connected-state used RS. The idle-state used RS may be, for example, a CRS in an LTE system or an SS in a 5G NR system. The connected-state used RS may be, for example, a DMRS and CSI-RS in the LTE system or a CSI-RS in the 5G system. There are no uniqueness limits made herein.

In a possible example, the method may further include that: responsive to detecting that a present area is not a valid measurement area and/or detecting that present time is not valid measurement time, the terminal releases the measurement configuration information.

It can be seen that, in the example, the terminal, responsive to detecting that a measurement condition is not met, timely releases an occupied resource associated with the measurement configuration information, so that improvement in management efficiency of radio transmission resources of the terminal is facilitated.

In a possible example, signaling bearing the measurement configuration information may be RRC connection release signaling or RRC reconfiguration signaling.

The measurement configuration information may include at least one of: a measurement frequency, a measurement pattern, valid measurement time and a valid measurement area.

The measurement frequency may include a measurement spectrum frequency. The valid measurement time may be configured to identify time when the measurement configuration is valid after the inactive state is entered. The valid measurement area may include one or more cells or include one or more RAN areas.

It can be seen that, in the example, the measurement configuration information may accurately instruct the terminal to make measurement to acquire the measurement result, so that improvement in accuracy of network configuration of the terminal is facilitated, in addition, an additional signaling overhead is also reduced, and configuration efficiency is improved.

Figure 5:
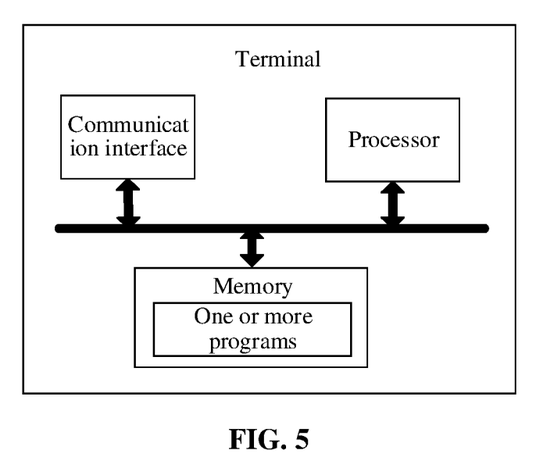
FIG. 5 is a structure diagram of a terminal according to an embodiment of the application.

Matched with the abovementioned embodiments, referring to FIG. 5, FIG. 5 is a structure diagram of a terminal according to an embodiment of the disclosure. As shown in the figure, the terminal includes one or more processors, a memory, a communication interface and one or more programs. The one or more programs are stored in the memory and configured to be executed by the one or more processors. The programs include instructions configured to execute the following operations.

Configuration information is acquired, the measurement configuration information including a measurement configuration of the terminal in a disconnected state and the disconnected state at least including one of an idle state and an inactive state.

A measurement result is acquired according to the measurement configuration.

It can be seen that, in the embodiment of the disclosure, the terminal acquires the measurement configuration information, the measurement configuration information including the measurement configuration of the terminal in the disconnected state and the disconnected state at least including one of the idle state and the inactive state, and then the terminal acquires the measurement result according to the measurement configuration. The terminal in the disconnected state may measure a network signal according to the measurement configuration information to acquire the measurement result, the terminal, after being switched to a connected state, may report the measurement result to the network device and the network device may fast preconfigure the terminal according to the measurement result, so that a signaling overhead in network configuration after the terminal is switched to the connected state is reduced, and improvement in efficiency of network configuration of the terminal is facilitated.

In a possible example, the measurement configuration information may include configuration information of an RS, and in terms of acquiring the measurement result according to the measurement configuration, the instructions in the programs may be specifically configured to execute the following operations: after switching to the inactive state, the RS is measured according to the measurement configuration to acquire a measurement result; or, after switching to the inactive state and responsive to detecting uplink data or a downlink paging message, the RS is measured according to the measurement configuration to acquire the measurement result.

In a possible example, the RS may include an idle-state used RS and/or a connected-state used RS.

In a possible example, the programs may further include instructions configured to execute the following operations: after the measurement result is acquired according to the measurement configuration, switching to a connected state is executed; and the measurement result is reported.

In a possible example, the measurement configuration information may include a triggering event of measurement reporting, and in terms of reporting the measurement result, the instructions in the programs may be specifically configured to execute the following operation: whether to report the measurement result or not is determined according to the triggering event of measurement reporting and, if the measurement result is determined to be reported, the measurement result is reported.

In a possible example, in terms of reporting the measurement result, the instructions in the programs may be specifically configured to execute the following operation: indication information is transmitted to a network device, the indication information being used to indicate the measurement result.

In a possible example, in terms of reporting the measurement result, the instructions in the programs may be specifically configured to execute the following operations: a request for reporting the measurement result is received from the network device; and the measurement result is reported to the network device.

In a possible example, uplink signaling bearing the reported measurement result may include any one of: a request for connection establishment, a request for connection resumption, signaling about connection establishment completion and signaling about connection resumption completion.

In a possible example, the programs may further include an instruction configured to execute the following operation: responsive to detecting that a present area is not a valid measurement area and/or detecting that present time is not valid measurement time, the measurement configuration information is released.

In a possible example, signaling bearing the measurement configuration information may be RRC connection release signaling or RRC reconfiguration signaling, and the measurement configuration information may include at least one of: a measurement frequency, a measurement pattern, valid measurement time and a valid measurement area.

Figure 6:
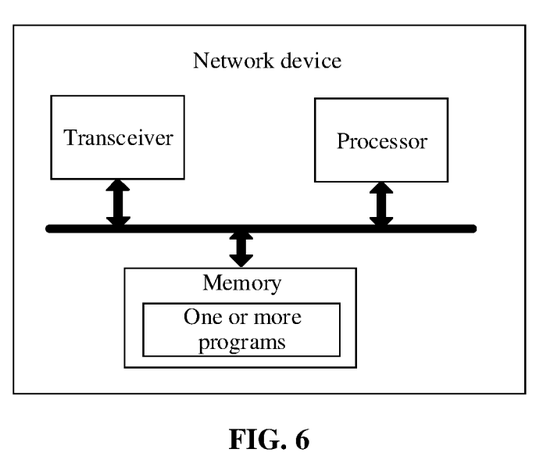
FIG. 6 is a structure diagram of a network device according to an embodiment of the application.

Matched with the abovementioned embodiments, referring to FIG. 6, FIG. 6 is a structure diagram of a network device according to an embodiment of the disclosure. As shown in the figure, the network device includes one or more processors, a memory, a communication interface and one or more programs. The one or more programs are stored in the memory and configured to be executed by the one or more processors. The programs include instructions configured to execute the following steps.

Configuration information is transmitted, the measurement configuration information including a measurement configuration of a terminal in a disconnected state, the measurement configuration information being used for the terminal to make measurement according to the measurement configuration to acquire a measurement result and the disconnected state at least including one of an idle state and an inactive state.

It can be seen that, in the embodiment of the disclosure, the terminal acquires configuration information, the measurement configuration information including the measurement configuration of the terminal in a disconnected state and the disconnected state at least including one of an idle state and an inactive state, and then the terminal acquires the measurement result according to the measurement configuration. The terminal in the disconnected state may measure a network signal according to the measurement configuration information to acquire the measurement result, the terminal, after being switched to a connected state, may report the measurement result to the network device and the network device may fast pre-configure the terminal according to the measurement result, so that a signaling overhead in network configuration after the terminal is switched to the connected state is reduced, and improvement in efficiency of network configuration of the terminal is facilitated.

In a possible example, the measurement configuration information may include configuration information of an RS.

In a possible example, the RS may include an idle-state used RS and/or a connected-state used RS.

In a possible example, the programs may further include an instruction configured to execute the following operation: after the measurement configuration information is transmitted, the measurement result is acquired, the measurement result being reported by the terminal that is switched to a connected state.

In a possible example, the measurement configuration information may include a triggering event of measurement reporting, and the terminal may determine whether to report the measurement result or not according to the triggering event of measurement reporting, and report the measurement result if the triggering event is initiated.

In a possible example, in terms of acquiring the measurement result, the instructions in the programs may be specifically configured to execute the following operation: indication information is received from the terminal, the indication information being used to indicate the measurement result.

In a possible example, in terms of acquiring the measurement result, the instructions in the programs may be specifically configured to execute the following operations: a request for reporting the measurement result is transmitted to the terminal; and the measurement result reported by the terminal in response to the request for reporting the measurement result is received.

In a possible example, uplink signaling bearing the measurement result may include any one of: a request for connection establishment, a request for connection resumption, signaling about connection establishment completion and signaling about connection resumption completion.

In a possible example, signaling bearing the measurement configuration information may be RRC connection release signaling or RRC reconfiguration signaling, and the measurement configuration information may include at least one of: a measurement frequency, a measurement pattern, valid measurement time and a valid measurement area.

In a possible example, the programs may further include an instruction configured to execute the following operation: preset configuration is made for the terminal in the disconnected state according to the measurement result, the preconfiguring including configuring a secondary carrier and/or a secondary SN.

The solutions of the embodiments of the application are introduced mainly from the angle of interaction between each network element. It can be understood that, for realizing the functions, the terminal and the network device include corresponding hardware structures and/or software modules for executing each function. Those skilled in the art may easily realize that the units and algorithm steps of each example described in combination with the embodiments in the disclosure may be implemented by hardware or a combination of the hardware and computer software in the application. Whether a certain function is executed by hardware or by driving the hardware by the computer software depends on specific applications and design constraints of the technical solutions. Professionals may realize the described functions for each specific application by different methods, but such realization shall fall within the scope of the application.

According to the embodiments of the application, functional units of the terminal and the network device may be divided according to the abovementioned method examples. For example, each functional unit may be divided correspondingly into each function and two or more than two functions may also be integrated into a processing unit. The integrated unit may be implemented in a hardware form and may also be implemented in form of software program modules. It is to be noted that division of the units in the embodiment of the application is schematic and only logical function division and another division manner may be adopted during practical implementation.

Figure 7:
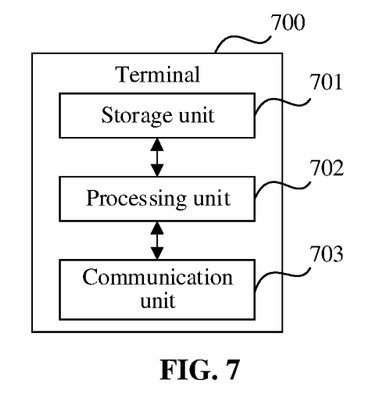
FIG. 7 is a block diagram of composition of functional units of a terminal according to an embodiment of the application.

Under the condition that an integrated unit is adopted, FIG. 7 is a possible block diagram of composition of functional units of a terminal involved in the abovementioned embodiments. The terminal 700 includes a processing unit 702 and a communication unit 703. The processing unit 702 is configured to control and manage an operation of the terminal. For example, the processing unit 702 is configured to support the terminal to execute the parts 202-203 in FIG. 2 and the parts 402-405 in FIG. 4, and/or is configured for another process of a technology described in the disclosure. The communication unit 703 is configured to support communication between the terminal and other devices, for example, communication with the network device shown in FIG. 5. The terminal may further include a storage unit 701, configured to store a program code and data of the terminal.

The processing unit 702 may be a processor or a controller, which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. Various exemplary logical blocks, modules and circuits described may be implemented or executed in combination with the contents in the application. The processor may also be a combination realizing a calculation function, for example, including a combination of one or more microprocessors and a combination of a DSP and a microprocessor. The communication unit 703 may be a transceiver, a transceiver circuit and the like. The storage unit 701 may be a memory.

The processing unit 702 is configured to acquire, through the communication unit 703, configuration information, the measurement configuration information including a measurement configuration of the terminal in a disconnected state and the disconnected state at least including one of an idle state and an inactive state, and acquire, through the communication unit 703, a measurement result according to the measurement configuration.

In a possible example, the measurement configuration information may include configuration information of an RS, and in terms of acquiring the measurement result according to the measurement configuration, the processing unit 702 is specifically configured to: after switching to the inactive state, measure the RS according to the measurement configuration to acquire a measurement result; or, after switching to the inactive state and responsive to detecting uplink data or a downlink paging message, measure the RS according to the measurement configuration to acquire the measurement result.

In a possible example, the RS may include an idle-state used RS and/or a connected-state used RS.

In a possible example, the processing unit 702, after acquiring, through the communication unit 703, the measurement result according to the measurement configuration, may be further configured to execute a handover to a connected state and report the measurement result.

In a possible example, the measurement configuration information may include a triggering event of measurement reporting, and in terms of reporting the measurement result, the processing unit 702 is specifically configured to determine whether to report the measurement result or not according to the triggering event of measurement reporting, and report the measurement result if the measurement result is determined to be reported.

In a possible example, in terms of reporting the measurement result, the processing unit 702 may be specifically configured to transmit, through the communication unit 703, indication information to a network device, the indication information being used to indicate the measurement result.

In a possible example, in terms of reporting the measurement result, the processing unit 702 may be specifically configured to receive, through the communication unit 703, a request for reporting the measurement result from the network device and report, through the communication unit 703, the measurement result to the network device.

In a possible example, uplink signaling bearing the reported measurement result may include any one of: a request for connection establishment, a request for connection resumption, signaling about connection establishment completion and signaling about connection resumption completion.

In a possible example, the processing unit 702 may be further configured to, responsive to detecting that a present area is not a valid measurement area and/or detecting that present time is not valid measurement time, release the measurement configuration information.

In a possible example, signaling bearing the measurement configuration information may be RRC connection release signaling or RRC reconfiguration signaling.

The measurement configuration information may include at least one of: a measurement frequency, a measurement pattern, valid measurement time and a valid measurement area.

When the processing unit 702 is a processor, the communication unit 703 may be a communication interface and the storage unit 701 may be a memory, the terminal involved in the embodiment of the application may be the terminal shown in FIG. 4.

Figure 8:
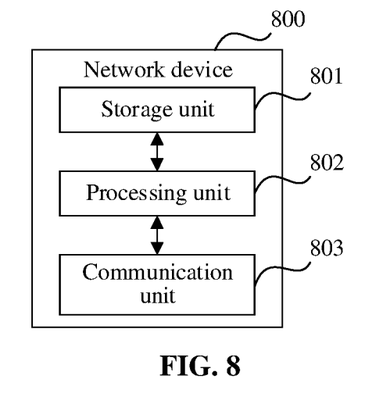
FIG. 8 is a block diagram of composition of functional units of a network device according to an embodiment of the application.

Under the condition that an integrated unit is adopted, FIG. 8 is a possible block diagram of composition of functional units of a network device involved in the above-mentioned embodiments. The network device 800 includes a processing unit 802 and a communication unit 803. The processing unit 802 is configured to control and manage an operation of the network device. For example, the processing unit 802 is configured to support the network device to execute the parts 301 to 303 in FIG. 3 and the parts 401, 406 and 407 in FIG. 4, and/or is configured for other processes of the technology described in the disclosure. The communication unit 803 is configured to support communication between the network device and other devices, for example, communication with the terminal shown in FIG. 4. The network device may further include a storage unit 801, configured to store a program code and data of the network device.

The processing unit 802 may be a processor or a controller, the communication unit 803 may be a transceiver, a transceiver circuit, a Radio Frequency (RF) chip and the like, and the storage unit 801 may be a memory.

The processing unit 802 is configured to transmit, through the communication unit 803, configuration information, the measurement configuration information including a measurement configuration of a terminal in a disconnected state, the measurement configuration information being used for the terminal to acquire a measurement result and the disconnected state at least including one of an idle state and an inactive state.

In a possible example, the measurement configuration information may include configuration information of an RS.

In a possible example, the RS may include an idle-state used RS and/or a connected-state used RS.

In a possible example, the processing unit 802, after transmitting, through the communication unit 803, the measurement configuration information, may be further configured to acquire, through the communication unit 803, the measurement result, the measurement result being reported by the terminal that is switched to a connected state.

In a possible example, the measurement configuration information may include a triggering event of measurement reporting, and the terminal may determine whether to report the measurement result or not according to the triggering event of measurement reporting, and report the measurement result if the triggering event is initiated.

In a possible example, in terms of acquiring the measurement result, the processing unit 802 may be specifically configured to receive, through the communication unit 803, indication information from the terminal, the indication information being used to indicate the measurement result.

In a possible example, in terms of acquiring the measurement result, the processing unit 802 may be specifically configured to transmit, through the communication unit 803, a request for reporting the measurement result to the terminal and receive, through the communication unit 803, the measurement result reported by the terminal in response to the request for reporting the measurement result.

In a possible example, uplink signaling bearing the measurement result may include any one of: a request for connection establishment, a request for connection resumption, signaling about connection establishment completion and signaling about connection resumption completion.

In a possible example, signaling bearing the measurement configuration information may be RRC connection release signaling or RRC reconfiguration signaling.

The measurement configuration information may include at least one of: a measurement frequency, a measurement pattern, valid measurement time and a valid measurement area.

In a possible example, the processing unit 802 may be further configured to pre-configure the terminal in the disconnected state according to the measurement result, the pre-configuring including configuring a secondary carrier and/or a secondary SN.

When the processing unit 802 is a processor, the communication unit 803 may be a communication interface and the storage unit 801 may be a memory, the network device involved in the embodiment of the application may be the network device shown in FIG. 5.

Figure 9:
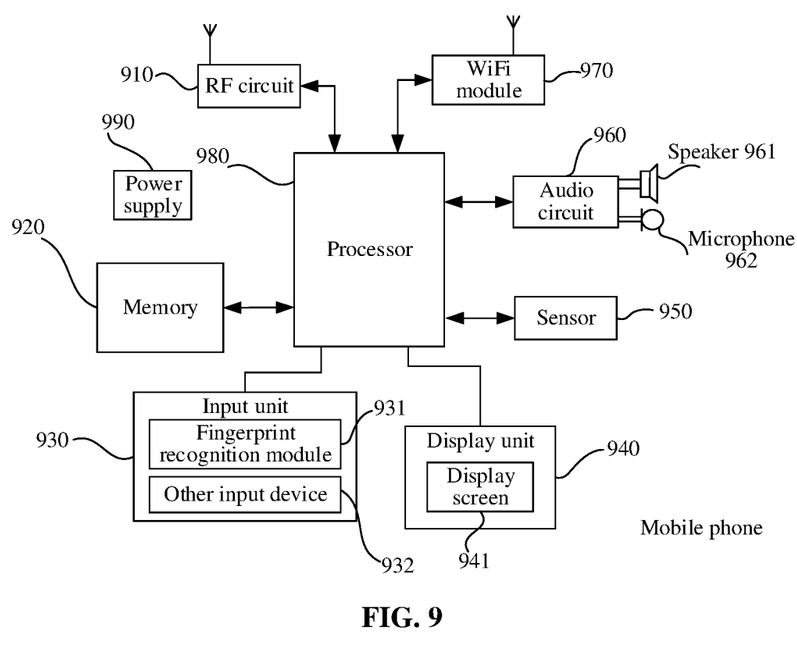
FIG. 9 is a structure diagram of another terminal according to an embodiment of the application.

An embodiment of the application also provides another terminal. As shown in FIG. 9, for convenient description, only parts related to the embodiment of the application are shown, and specific technical details which are undisclosed refer to parts of the method of the embodiments of the application. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 9 is a block diagram of part of a structure of a mobile phone related to a terminal according to an embodiment of the application. Referring to FIG. 9, the mobile phone includes components such as an RF circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 9 is not intended to limit the mobile phone and may include components more or fewer than those shown in the figure or some components are combined or different component arrangements are adopted.

Each component of the mobile phone will be specifically introduced below in combination with FIG. 9.

The RF circuit 910 may be configured to receive and transmit information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and other devices through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), LTE, an electronic mail, Short Messaging Service (SMS) and the like.

The memory 920 may be configured to store a software program and a module. The processor 980 may operate the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and other input device 932. The fingerprint recognition module 931 may acquire fingerprint data of a user thereon. Besides the fingerprint recognition module 931, the input unit 930 may further include the other input device 932. Specifically, the other input device 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 9, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and other sensors. Specifically, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application capable of recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be set in the mobile phone will not be elaborated herein.

The audio circuit 960 may include a speaker 961, and a microphone 962 may provide an audio interface between the user and the mobile phone. The audio circuit 960 may transmit an electric signal obtained by converting received audio data to the speaker 961, and the speaker 961 may convert it into a sound signal for playing. On the other hand, the microphone 962 may convert a collected sound signal into an electric signal, the audio circuit 960 may receive and convert it into audio data, and the audio data is processed by the playing processor 980 and transmitted to, for example, another mobile phone through the RF circuit 910, or the audio data is played to the memory 920 for further processing.

WiFi is a short-distance wireless transmission technology. The mobile phone may help the user through the WiFi module 970 to receive and transmit an electronic mail, browse a webpage, access streaming media and the like, and wireless wideband Internet access is provided for the user. Although the WiFi module 970 is shown in FIG. 9, it can be understood that it is not a necessary composition of the mobile phone and may completely be omitted according to a requirement without changing the scope of the essence of the disclosure.

The processor 980 is a control center of the mobile phone, for connecting each part of the whole mobile phone through various interfaces and lines and executing various functions and data processing of the mobile phone by running or executing the software program and/or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may be not integrated into the processor 980.

The mobile phone may further include the power supply 990 for supplying power (for example, a battery) to each part. Preferably, the power supply may be logically connected with the processor 980 through a power management system, thereby realizing functions of charging and discharging management, power consumption management and the like through the power management system.

Although not shown in the figure, the mobile phone may further include a camera, a Bluetooth module and the like, which will not be elaborated herein.

In the embodiments shown in FIG. 2 to FIG. 4, the flow on a terminal side in each operation of the method may be implemented based on the structure of the mobile phone.

In the embodiments shown in FIG. 4 and FIG. 5, each functional unit may be implemented based on the structure of the mobile phone.

An embodiment of the application also provides a computer-readable storage medium, which stores a computer program for electronic data exchange, the computer program enabling a computer to execute part or all of the operations executed by the terminal in, for example, the abovementioned method embodiments.

An embodiment of the application also provides a computer-readable storage medium, which stores a computer program for electronic data exchange, the computer program enabling a computer to execute part or all of the operations executed by the network device in, for example, the abovementioned method embodiments.

An embodiment of the application also provides a computer program product. The computer program product includes a non-transitory computer-readable storage medium storing a computer program. The computer program may be operated to enable a computer to execute part or all of the operations executed by the terminal in, for example, the abovementioned method embodiments. The computer program product may be a software installation package.

An embodiment of the application also provides a computer program product. The computer program product includes a non-transitory computer-readable storage medium storing a computer program. The computer program may be operated to enable a computer to execute part or all of the operations executed by the network device in the abovementioned methods. The computer program product may be a software installation package.

The operations of the method or algorithm described in the embodiments of the application may be implemented by hardware, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the application may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the application are completely or partially generated. The computer may be a universal computer, a dedicated computer, a computer network or other programmable devices. The computer instruction may be stored in a computer-readable storage medium or transmitted from one computer-readable storage medium to another computer-readable storage medium. For example, the computer instruction may be transmitted from a website, computer, server or data center to other websites, computers, servers or data centers in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the application in detail. It is to be understood that the above is only the specific implementation mode of the embodiments of the application and not intended to limit the scope of protection of the embodiments of the application. Any modifications, equivalent replacements, improvements and the like made based on the technical solutions of the embodiments of the application shall fall within the scope of protection of the embodiments of the application.

The invention claimed is:

1. A method for measurement configuration, comprising:
acquiring, by a terminal, measurement configuration information from a network device, the measurement configuration information comprising a measurement configuration of the terminal in an inactive state; and
acquiring, by the terminal in the inactive state, a measurement result according to the measurement configuration,
wherein when the terminal is in the inactive state, consumption of measurement power and overhead of handover signaling of the terminal is reduced and a link is capable of being recovered fast for the terminal to transmit data,
wherein the measurement result is used for the network device to pre-configure the terminal in a connected state, the pre-configuring including configuring a secondary carrier or configuring a secondary carrier and a secondary service node (SN).

2. The method of claim 1, wherein the measurement configuration information comprises configuration information of a Reference Signal (RS) for measurement, and acquiring, by the terminal in the inactive state, the measurement result according to the measurement configuration comprises:
after the terminal is switched to the inactive state, measuring the RS according to the measurement configuration to acquire the measurement result; or,
after the terminal is switched to the inactive state, in response to that uplink data or a downlink paging message is detected, measuring the RS according to the measurement configuration to acquire the measurement result;
wherein the RS comprises at least one of an idle-state used RS and a connected-state used RS.

3. The method of claim 1, after acquiring, by the terminal in the inactive state, the measurement result according to the measurement configuration, the method further comprising:
switching the terminal to a connected state; and
reporting, by the terminal, the measurement result;
wherein the measurement configuration information comprises a triggering event of measurement reporting, and reporting, by the terminal, the measurement result comprises:
determining, by the terminal, whether to report the measurement result or not according to the triggering event of measurement reporting, and reporting the measurement result if the triggering event is initiated.

4. The method of claim 3, wherein
the triggering event of measurement reporting is that a signal strength or signal quality of a neighbor serving cell is greater than a preset threshold, or that a signal strength or signal quality of a neighbor serving cell is higher than a signal strength or signal quality of a presently connected serving cell by an offset;
the signal strength or signal quality is any value representing a signal strength and quality including at least one of the signal strength, the signal quality and a signal-to-noise ratio.

5. The method of claim 4, wherein reporting, by the terminal, the measurement result comprises:
transmitting, by the terminal, indication information to a network device, the indication information being used to indicate the measurement result.

6. The method of claim 4, wherein reporting, by the terminal, the measurement result comprises:
receiving, by the terminal, a request for reporting the measurement result from the network device; and
reporting, by the terminal, the measurement result to the network device.

7. The method of claim 1, further comprising:
releasing, by the terminal, the measurement configuration information, responsive to detecting that a present area is not a valid measurement area and/or detecting that present time is not valid measurement time.

8. The method of claim 1, wherein signaling bearing the measurement configuration information is Radio Resource Control (RRC) connection release signaling or RRC reconfiguration signaling;
the measurement configuration information comprises at least one of a measurement frequency, a measurement pattern, valid measurement time and a valid measurement area, wherein the measurement frequency includes a measurement spectrum frequency; the valid measurement time is configured to identify time when the measurement configuration is valid after the inactive state is entered; and the valid measurement area includes one or more cells or includes one or more Radio Access Network (RAN) areas.

9. A method for measurement configuration, comprising:
transmitting, by a network device, measurement configuration information to a terminal, the measurement configuration information comprising a measurement configuration of the terminal in an inactive state, the measurement configuration information being used for the terminal in the inactive state to make measurement according to the measurement configuration to acquire a measurement result,
wherein consumption of measurement power and overhead of handover signaling of the terminal in the inactive state is reduced and a link is capable of being recovered fast for the terminal in the inactive state to transmit data,
wherein the measurement result is used for the network device to pre-configure the terminal in a connected state, the pre-configuring including configuring a secondary carrier or configuring a secondary carrier and a secondary service node (SN).

10. The method of claim 9, wherein the measurement configuration information comprises configuration information of a Reference Signal (RS) for measurement.

11. A network device, comprising a processor, a memory, a transceiver and one or more programs, wherein the one or more programs are stored in the memory and configured to be executed by the processor to control the transceiver to execute the step in the method of claim 9.

12. The network device of claim 11, wherein the transceiver is configured to:
acquire the measurement result, the measurement result being reported by the terminal that is switched to a connected state.

13. The network device of claim 11, wherein the measurement configuration information comprises a triggering event of measurement reporting, and the measurement result is reported if the triggering event is initiated after the terminal determines whether to report the measurement result or not according to the triggering event of measurement reporting.

14. A terminal, comprising:
a processor; and
a communication interface capable of being connected to the processor;
wherein the processor is configured to:
control the communication interface to acquire measurement configuration information, the measurement configuration information comprising a measurement configuration of the terminal in an inactive state; and
control the communication interface to acquire a measurement result according to the measurement configuration,
wherein when the terminal is in the inactive state, consumption of measurement power and overhead of handover signaling of the terminal is reduced and a link is capable of being recovered fast for the terminal to transmit data,
wherein the measurement result is used for the network device to pre-configure the terminal in a connected state, the pre-configuring including configuring a secondary carrier or configuring a secondary carrier and a secondary service node (SN).

15. The terminal of claim 14, wherein the processor is further configured to:
switch the terminal to a connected state; and
report the measurement result;
wherein the measurement configuration information comprises a triggering event of measurement reporting;
the processor is further configured to determine whether to report the measurement result or not according to the triggering event of measurement reporting, and report the measurement result if the triggering event is initiated.

16. The terminal of claim 15, wherein the triggering event of measurement reporting is that a signal strength or signal quality of a neighbor serving cell is greater than a preset threshold, or that a signal strength or signal quality of a neighbor serving cell is higher than a signal strength or signal quality of a presently connected serving cell by an offset;
the signal strength or signal quality is any value representing a signal strength and quality including at least one of the signal strength, the signal quality and a signal-to-noise ratio.

17. The terminal of claim 16, wherein the communication interface is configured to:
transmit indication information to a network device, the indication information being used to indicate the measurement result.

18. The terminal of claim 16, wherein the processor is further configured to:
control the communication interface to receive from the network device a request for reporting the measurement result; and
report the measurement result to the network device.

19. The terminal of claim 14, wherein the one or more programs comprise instructions further configured to execute a step of:
releasing the measurement configuration information, responsive to detecting at least one of facts that a present area is not a valid measurement area and present time is not valid measurement time.

* * * * *